(No Model.)
E. K. SARGEANT.
MACHINE FOR MAKING COFFEE.
No. 382,111. Patented May 1, 1888.
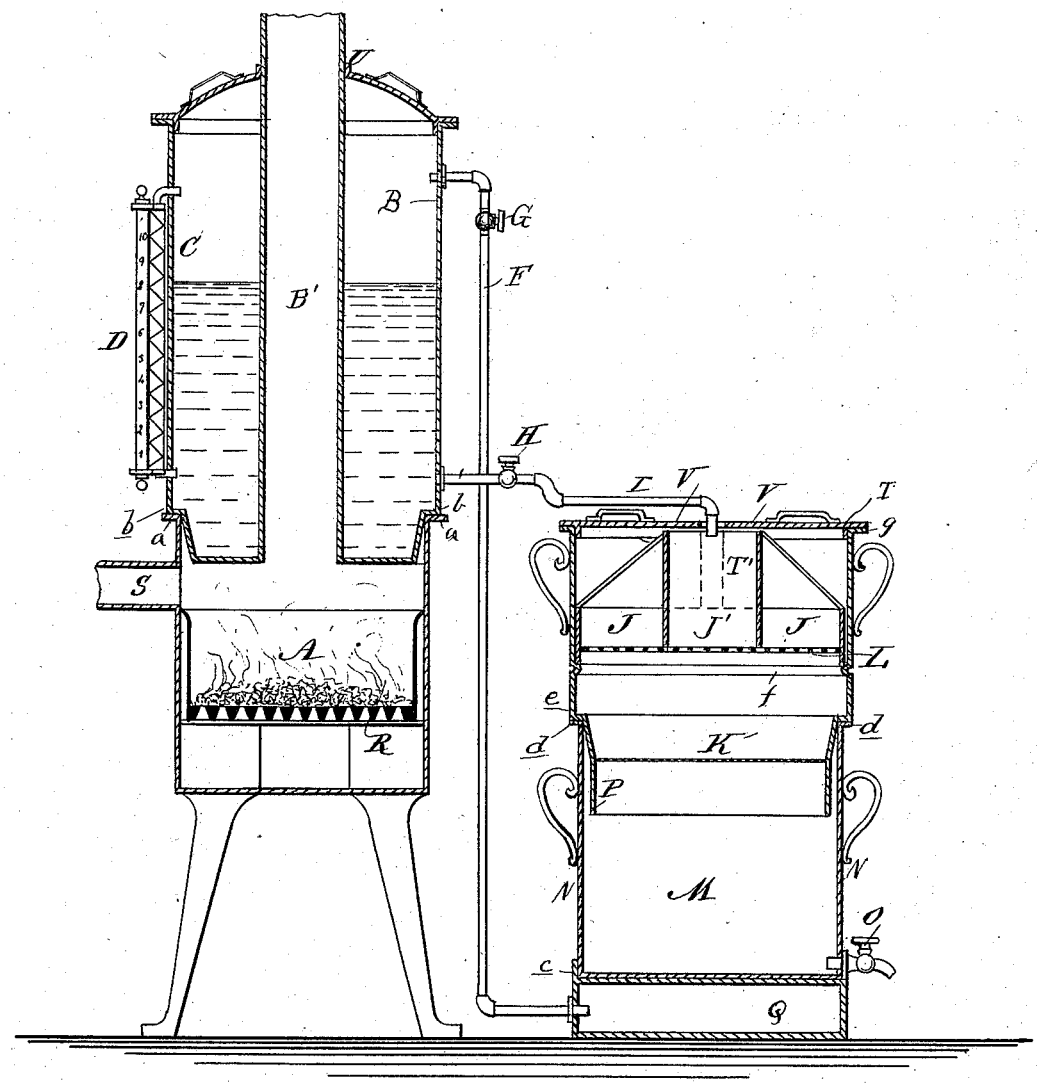
WITNESSES:
INVENTOR: Edmund K. Sargeant,

UNITED STATES PATENT OFFICE.

EDMUND K. SARGEANT, OF BROCKVILLE, ONTARIO, CANADA.

MACHINE FOR MAKING COFFEE.

SPECIFICATION forming part of Letters Patent No. 382,111, dated May 1, 1888.

Application filed February 2, 1887. Serial No. 226,292. (No model.) Patented in Canada March 31, 1886 No. 23,726.

*To all whom it may concern:*

Be it known that I, EDMUND K. SARGEANT, a citizen of the United States, now residing in Brookville, Province of Ontario, Canada, have invented a new and useful Machine for Making Coffee, (for which I have obtained a patent in Canada, Serial No. 40,752, dated the 31st of March, 1886, No. 23,726,) of which the following is a specification.

My invention relates to certain new and useful improvements in devices for making coffee; and it consists in the peculiar combinations and the novel construction, arrangement, and adaptation of parts, all as more fully hereinafter described and claimed.

The drawing represents a central vertical section of my improved device.

A is the heater or stove, supported upon suitable legs and provided with a grate, R, a flue, S, and an annular outwardly-extending flange, *a*.

B is the boiler, formed near the bottom thereof with an offset, *b*, by which it is supported upon the flange *a* of the heater. This boiler is provided with the central flue, B′, the glass tube C, showing the quantity of water in the boiler, and the indicator D.

Q is a steam-chamber connected with the upper end of the boiler by means of the pipe F, provided with a cock, G. This chamber is formed with an upwardly-extending flange, *c*, within which is removably set the coffee-urn M, provided with handles N and a faucet, O, by means of which the coffee may be withdrawn. The top of this urn is formed with an outwardly-extending flange, *d*, designed to removably support the receptacle P, formed with an offset, *e*, to rest upon the flange *d*, and provided with a fine wire-gauze diaphragm, K′. Above the offset *e* the receptacle P is formed with an interior bead, *f*, designed to support a gauze bottom, J′. The upper end of the receptacle P is provided with an outwardly-extending flange, *g*, to support the cover V, which has a depending flange, T.

I is a water-pipe connecting with the boiler B, near the lower end thereof, and through which the water flows into the filter J, being passed through a hole in the cover V. H is a cock in the water-pipe I.

In operation the ground coffee is placed upon the bottom K′ of the receptacle P. The filter is then put in place, a fire is started in the heater, and when the water is boiling a small quantity is let into the filter through the pipe I, just enough to dampen the coffee, and it is permitted to stand a few minutes for the purpose of forming a mass. More water is then let into the filter through the pipe I, and it passes through the gauze J′, and through the coffee and the gauze K′ into the urn, and the coffee is made. The steam from the boiler is conveyed through the pipe F into the chamber Q and utilized for the purpose of keeping the coffee in the urn hot.

I claim—

1. The combination, with the heater and the boiler, of the steam-chamber Q, connected with the steam-space of the boiler, the urn supported by said chamber, and the water-pipe leading from the water-space of the boiler and communicating with said urn, substantially as and for the purpose specified.

2. The combination, with the heater and the boiler, of the steam-chamber Q, connected with the steam-space of the boiler, the urn supported by said chamber, the removable filter, the pipe I, connected with the lower part of the boiler, and the pipe F, connected with the steam-space of the boiler and with said steam-chamber, substantially as described.

3. The combination, with the steam-chamber and the urn removably supported thereby, of the receptacle P, removably supported by said urn and formed with interior bead, *f*, and the filter removably supported by said bead, substantially as described.

Brockville, Ontaria, Canada, November 3, 1886.

EDMUND K. SARGEANT.

Witnesses:
   W. B. COLCOCK,
   W. R. SCUCE.